United States Patent [19]
Whitfield

[11] Patent Number: 5,893,358
[45] Date of Patent: Apr. 13, 1999

[54] PELLET FUEL BURNER FOR HEATING AND DRYING SYSTEMS

[75] Inventor: Oliver J. Whitfield, Bow, Wash.

[73] Assignee: Pyro Industries, Inc., Burlington, Wash.

[21] Appl. No.: 08/964,087

[22] Filed: Nov. 4, 1997

[51] Int. Cl.$^6$ ........................................ F24B 13/04
[52] U.S. Cl. ............... 126/73; 126/68; 126/112; 110/110; 110/233; 110/297
[58] Field of Search .................. 126/73, 68, 76, 126/77, 151, 146, 112; 110/297, 233, 110, 300, 298; 432/121

[56] References Cited

U.S. PATENT DOCUMENTS

| | | |
|---|---|---|
| 4,017,254 | 4/1977 | Jones . |
| 4,517,903 | 5/1985 | Richmond et al. . |
| 4,922,889 | 5/1990 | Nuesmeyer et al. ............ 126/73 |
| 4,947,769 | 8/1990 | Whitfield . |
| 5,103,744 | 4/1992 | Tunströmer . |
| 5,137,010 | 8/1992 | Whitfield et al. . |
| 5,137,012 | 8/1992 | Crossman, Jr. et al. . |
| 5,139,008 | 8/1992 | Timpano . |
| 5,158,025 | 10/1992 | Johnson . |
| 5,197,397 | 3/1993 | Yamagishi et al. . |
| 5,285,738 | 2/1994 | Cullen . |
| 5,295,474 | 3/1994 | Whitfield et al. . |
| 5,343,819 | 9/1994 | Charest . |
| 5,383,446 | 1/1995 | Whitfield . |
| 5,429,110 | 7/1995 | Burke et al. ............... 126/73 |
| 5,488,943 | 2/1996 | Whitfield et al. . |
| 5,617,841 | 4/1997 | Whitfield et al. . |

*Primary Examiner*—James C. Yeung
*Attorney, Agent, or Firm*—Christensen O'Connor Johnson & Kindness PLLC

[57] ABSTRACT

A pellet fuel burner includes a compact thermally insulated firebox for providing hot gases to a boiler, furnace or dryer. The apparatus includes a grate that includes a reciprocating arm for removing clinkers and ash from the grate. Pellet fuel feed is provided by a hopper that is isolated from the firebox by an airlock. A combustion air manifold is provided around the firebox to preheat primary and secondary combustion air.

12 Claims, 5 Drawing Sheets

5,893,358

PELLET FUEL BURNER FOR HEATING AND DRYING SYSTEMS

FIELD OF THE INVENTION

The present invention relates to a pellet fuel burner for providing hot gas to furnaces or to boilers used for residential and industrial space heating and other applications.

BACKGROUND OF THE INVENTION

Hydronic space heating systems comprise a boiler that delivers hot water throughout an area to be heated. Current applications include wall mounted radiators or tubes embedded in the floors of residences or industrial sites for distributing the hot water throughout the home or building. A substantial portion of boilers for hydronic heating systems are oil or gas fired, using an external burner that generates hot gases and delivers the hot gases to a boiler to elevate the temperature of the water. Such oil and gas burners have been developed to a high level of sophistication to provide safe, reliable, and efficient burning of the fuel, with extremely low levels of emissions.

Combustion of fossil fuels such as coal, oil and natural gas generates substantial quantities of carbon dioxide. This contributes to the environmental problem of "global warming" that results from the excessive build-up of these "greenhouse gases." Wood is commonly used as a residential heating fuel in areas where wood is readily available and economical. Use of wood has some obvious drawbacks due to the need for frequent manual loading of the fuel, storage of the fuel, variability in the moisture of the fuel and the need to remove ashes resulting from the combustion of the fuel.

Wood pellets, a dry, processed, wood fuel made from waste sawdust, chips, etc., can be an economical and environmentally safe fuel substitute for fossil fuels for the purpose of residential and industrial space heating. In contrast to fossil fuels, which contribute to the buildup of greenhouse gases, wood is considered a "renewable fuel" that contributes no net buildup of atmospheric carbon dioxide.

The use of these wood pellets in heating stoves is widespread. One example of such type of stove is described in U.S. Pat. No. 5,488,943, by the applicant of the subject application. In these types of wood stoves, which are generally free standing or fireplace inserts, the wood pellets are combusted to provide hot gas which is passed through a heat exchanger to transfer thermal energy to room air that occupies the opposite side of the heat exchanger. Users of these types of pellet fuel heating stoves find them desirable because of the aesthetic advantages of a natural flame that is readily visible through the door of the stove.

The attractiveness of wood as an alternative to fossil fuel has led to the development of several hydronic heating systems that employ boilers that are fueled by wood pellets. These systems provide an environmentally friendly alternative to existing fossil fueled boilers. In those instances where the boilers themselves do not need to be replaced, the user must decide whether his or her desire for a burner fueled by a renewable fuel is outweighed by the cost of replacing an otherwise satisfactory fossil fuel burner. Given the large number of fossil fuel boilers in use, it would be desirable if a hot gas generator fueled by wood pellets was available which could be used to replace the fossil fuel burner of existing boilers. This would avoid the cost of replacing the entire boiler unit and would result in less waste of valuable resources. There have been attempts to design pellet fuel burners that would replace fossil fuel burners in existing boilers; however, such designs generally attempt to place the actual burner grate within the boiler. This approach suffers from the drawback that a specific burner design is required for each unique boiler design.

In hydronic heating systems, the heat transfer efficiency from the hot gases produced by the combustion of fuel to the boiler decreases proportionately to the quantity of air used in the combustion process. Oil burners typically utilize 15%–30% excess air above theoretical "stoichiometric" requirements and generate emissions of carbon monoxide and nitrogen dioxide on the order of 50 parts per million. First generation designs of boilers using wood pellets as a fuel use 200% excess air or higher and can emit carbon monoxide levels in excess of 500 parts per million.

With the concern for "global warming" and the push to implement alternative fuel sources which are renewable and environmentally friendly, prior designs of burners using wood pellets as a source of hot gases for hydronic heating systems have met limited acceptance because of the high levels of excess air required, lower efficiencies, high levels of carbon monoxide they emit, and the need for numerous designs to correspond with the multitude of boiler designs, even though they employ a renewable fuel source.

SUMMARY OF THE INVENTION

The present invention provides a burner system for automatically feeding and combusting wood pellets to generate hot gases for use in a number of applications, such as a boiler or forced air furnace for residential and industrial space heating. Another application includes a dryer for agricultural or industrial uses. The burner of the present invention utilizes quantities of combustion air and produces quantities of emissions comparable to state-of-the-art oil or gas burners. The control and automatic features of the burner permit wood, a "renewable fuel," to be used as a practical, economical and environmentally safe alternative to oil or gas in space heating and drying applications. The present invention achieves these results by using a unique double wall, thermally insulated combustion chamber and a grate design that promotes intimate mixing of combustion air with the wood fuel while processing the inorganic ash downward through the grate. The high temperatures and effective combustion air mixing achieved with the combustion chamber of the present invention provide favorable combustion conditions, resulting in high heat transfer efficiencies to boilers, furnaces and dryers, and low emissions.

The burner system is designed as an external, stand-alone unit which delivers hot gases to a boiler or forced air furnace. Providing the burner independently, the unit can be readily retrofitted to existing burners and furnaces which currently use oil or gas fuel. The external, stand-alone nature of the burner system of the present invention makes the system particularly well suited for replacing any externally mounted fossil fuel burner that delivers hot gases to a boiler or furnace. In those instances where a preexisting oil or gas fueled burner is not external, i.e., is located within the boiler or furnace, the above described retrofit involves removal of the oil or gas fuel burner and may involve the provision of additional hardware to connect the outlet of the pellet fuel burner to the boiler or furnace so that it can deliver hot gases thereto.

In accordance with the present invention, a burner fueled by pelletized fuel for providing thermal energy, in the form of hot gas, includes a source of pelletized fuel. The source of pelletized fuel communicates with a combustion chamber or firebox that includes a shell made of a refractory material, an inlet for combustion air, an outlet for the combustion gases, a baffle between the inlet and the outlet, an exterior surface and an interior surface. The shell and the baffle cooperate to define an internal gas pathway, preferably serpentine in shape, leading from the inlet to the outlet. A thermal insulating shell comprising a thermal insulating material contacts the exterior surface of the combustion chamber and substantially surrounds the combustion chamber. A grate is located below the inlet of the combustion chamber where the pelletized fuel from the fuel source is received and combusted. The apparatus further includes a combustion air manifold surrounding the thermal insulating shell for delivering combustion air from a combustion air source around the thermal insulating shell to the grate. Preferably, the combustion air is preheated as it passes from the combustion air source to the grate by thermal energy that emanates from the combustion chamber and passes through the thermal insulating shell.

The apparatus of the present invention produces hot combustion gases at the outlet that are at a temperature of at least 1000° F., and preferably at least 2000° F. The gases can be delivered to a boiler or furnace for utilization. The compact nature, thermal insulation of the combustion chamber, and efficient combustion capabilities combine to provide an apparatus capable of producing a specific thermal energy output on the order of 400K BTU/hr/ft$^3$, and preferably at least 500K BTU/hr/ft$^3$.

In a preferred embodiment, the grate comprises a plurality of spaced apart rods and a reciprocating element that extends between the rods for agitating the fuel bed and removing clinkers and ash from the grate. The removed clinkers and ash are collected in an ash pan positioned below the grate. This ash pan is readily accessible so that the removal of clinkers and ash can be accomplished safely and efficiently, using a manual or automatic auger system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In the following description of a pellet burner formed in accordance with the present invention, the materials for the individual elements are generally carbon steel, unless otherwise expressly indicated. The advantages of the present invention can be achieved by using comparable material and accordingly, the present invention is not limited to those specific materials set forth herein.

As used herein, the term "combustion air" refers to gases necessary to support the combustion of a pelletized fuel. Preferably, the combustion gas is ambient air.

The following description describes the present invention in the context of a burner for supplying hot gases to a boiler. It should be understood that other devices such as a furnace or dryer could be used in conjunction with the present invention.

Figure 1:
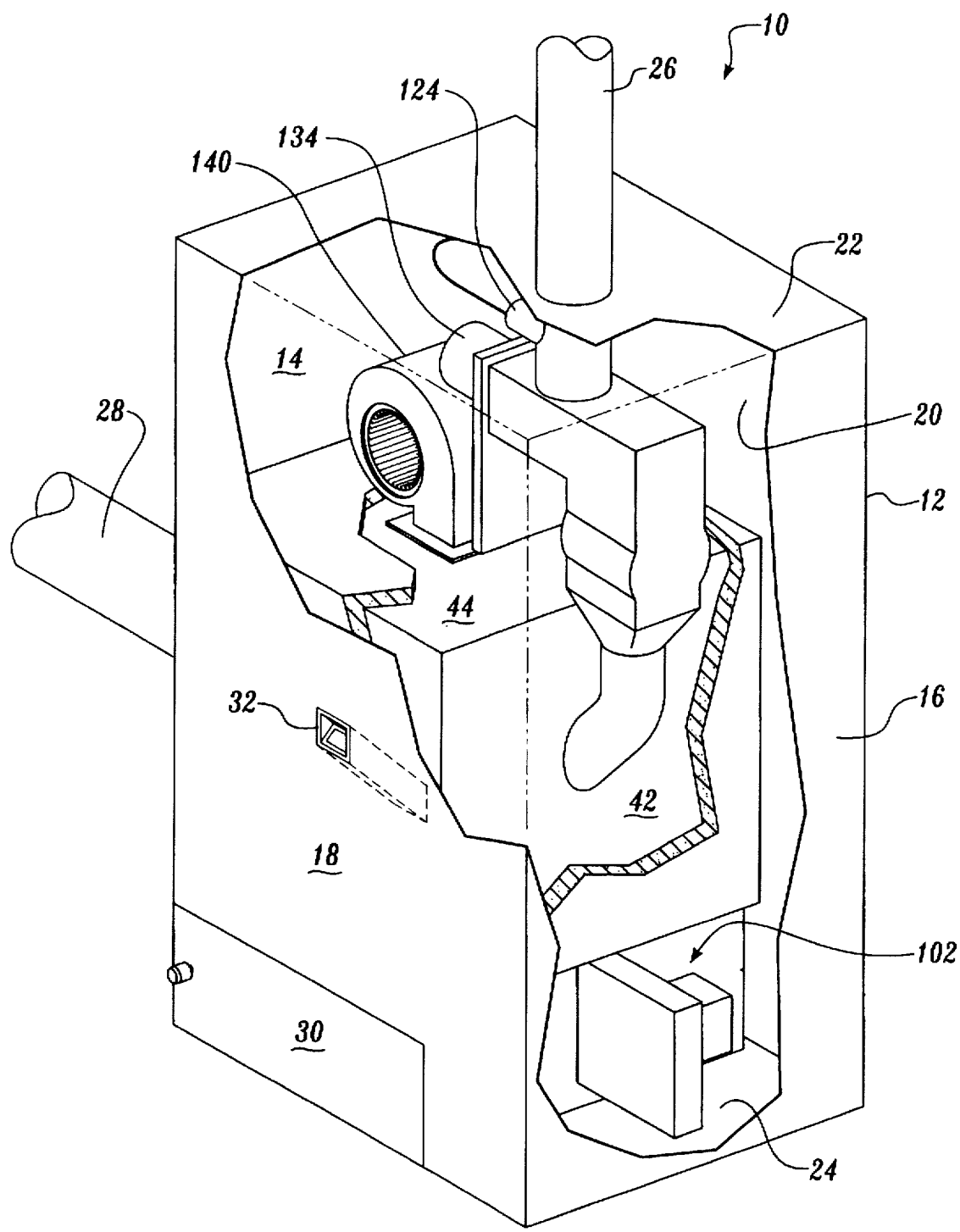
FIG. 1 is a perspective view with a portion cut away of a pellet fuel burner formed in accordance with the present invention.
Figure 5:
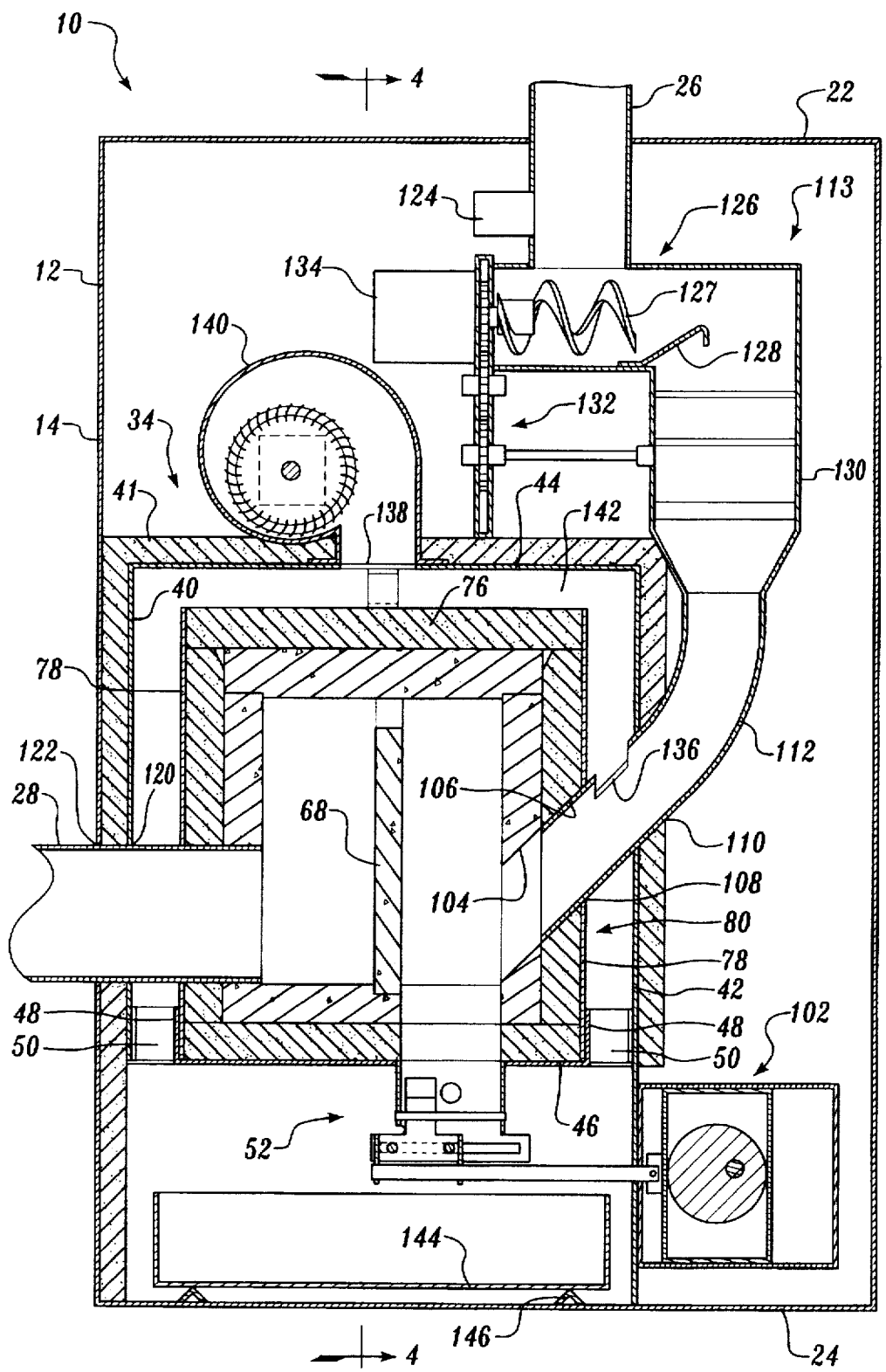
FIG. 5 is a cross-sectional view taken along line 5—5 in FIG. 4.

Referring to FIGS. 1 and 5, a pellet burner 10 formed in accordance with the present invention is enclosed within a housing 12. The illustrated embodiment is a pellet burner for supplying hot gases to a boiler that supplies hot water to a residential hydronic heating system. It should be understood that the following description and principles are equally applicable to larger pellet burners that would be suitable for use in industrial space heating applications, drying applications and other thermal applications that require hot gases, although the specific dimensions may be proportionately larger or smaller. Housing 12 is a generally cube-shaped enclosure having front wall 14, opposing rear wall 16, right sidewall 18, left sidewall 20, top 22 and floor 24. Top 22 includes an orifice through which fuel conduit 26 passes and is attached to trough 126 as described below in more detail. The opposite end of fuel conduit 26 is connected to a source of pelletized fuel such as a hopper (not shown). Passing through the lower half of front wall 14 is one end of combustion gas conduit 28. The opposite end of combustion gas conduit 28 is configured for attachment to a device capable of utilizing the hot gases, such as a boiler or furnace (not shown). The bottom front corner of right sidewall 18 includes access door 30 which closes an opening that permits access to the interior of housing 12. As described below in more detail, ash can be removed from the pellet burner 10 through door 30. Right sidewall 18 also includes a viewing port 32 to allow for the visual inspection of the interior of the combustion chamber described below in more detail.

Housing 12 provides a framework to which other elements of the pellet burner are attached and supported as described below in more detail. In addition, housing 12 serves as a safety barrier to isolate moving parts and hot parts from the surrounding environment.

Figure 2:
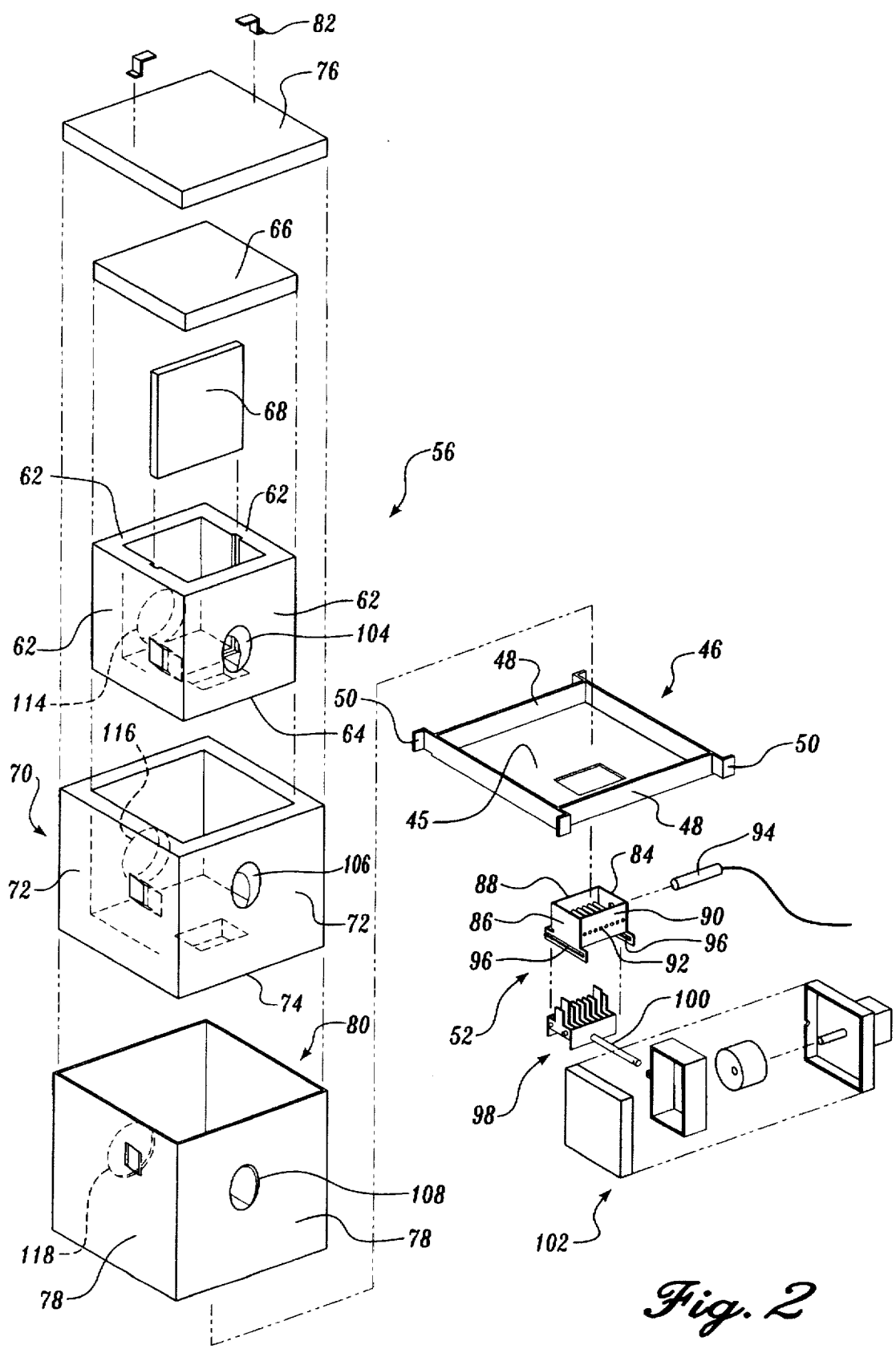
FIG. 2 is an exploded view of the components inside the burner casing.
Figure 4:
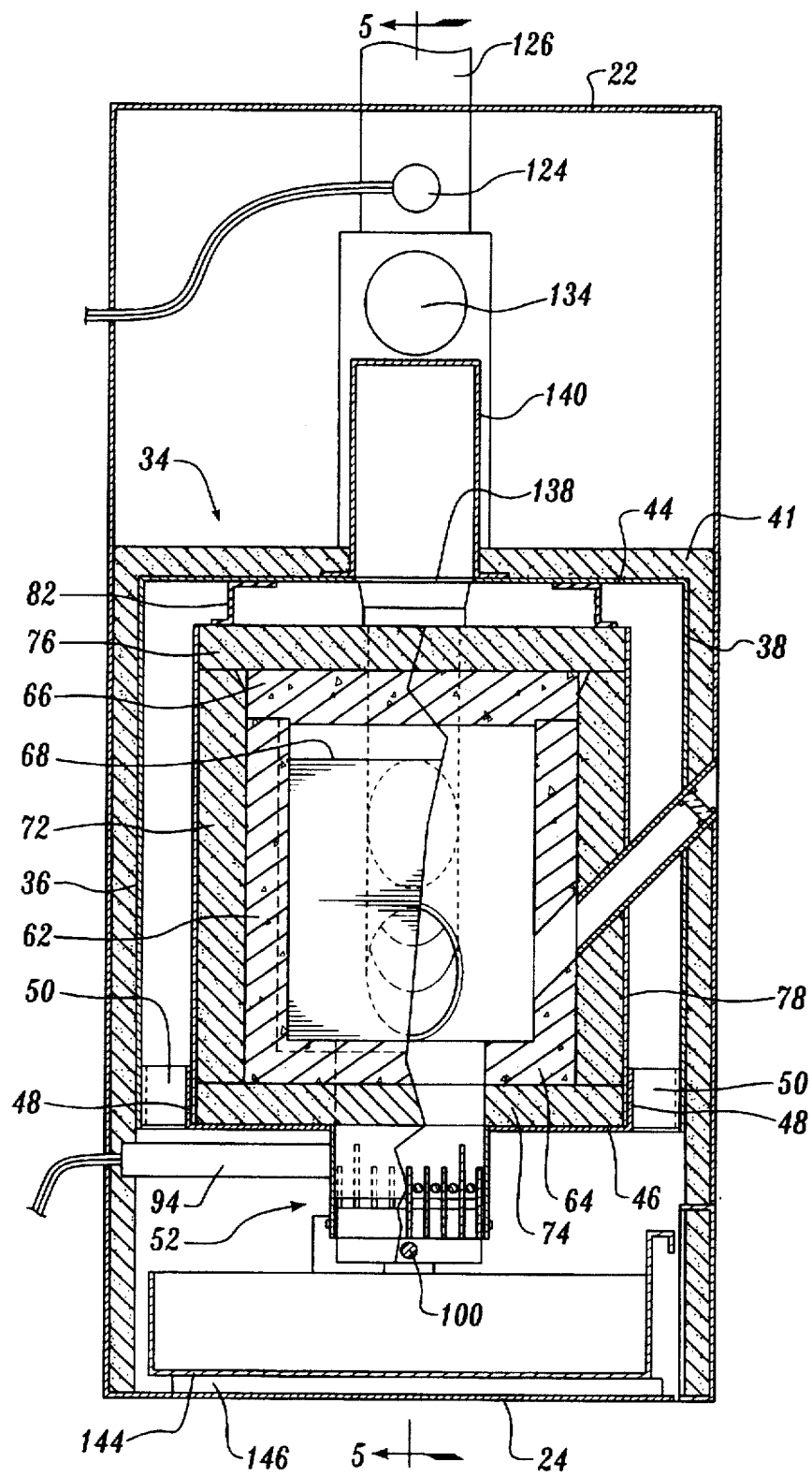
FIG. 4 is a cross-sectional view taken along line 4—4 in FIG. 5 with a portion cut away.

Referring specifically to FIGS. 2, 4 and 5, centered between the right sidewall 18 and left sidewall 20, towards the front of housing 12, is cube-shaped burner casing 34 that includes left sidewall 36, opposing right sidewall 38, front sidewall 40 and rear sidewall 42. Left sidewall 36 and right sidewall 38 extend upward from floor 24 about two-thirds of the height of housing 12. Rear wall 42 is spaced rearward from front wall 14 of housing 12 about two-thirds the depth of housing 12 and extends upward from floor 24 to the same height as left sidewall 36 and right sidewall 38. Front wall 40 of burner casing 34 is separated from the inner surface of front wall 14 of housing 12 by a layer of insulation 41. Front wall 40 extends from a location spaced above floor 24 of housing 12 to the same height as the left sidewall, right sidewall and rear sidewall of burner casing 34. The upper ends of left sidewall 36, right sidewall 38, front sidewall 40 and rear sidewall 42 are connected to each other by top 44 to form enclosed burner casing 34.

Suspended from front sidewall 40 and rear sidewall 42 within burner casing 34 is firebox support 46. Firebox support 46 is a square tray having upward extending peripheral sidewalls 48. Extending forward and rearward of the four corners of firebox support 46 are support flanges 50. The ends of the support flanges 50 extending from the front of firebox support 46 are attached to the inner surface of front sidewall 40. The free ends of support flanges 50 extending from the rear of firebox support 46 are attached to the inner surface of rear sidewall 42. This attachment can be achieved by conventional means such as welding, bolting, or riveting the flanges in place. As a result of securing support flanges to the burner casing 34, firebox support 46 is suspended above floor 24 of housing 12. Firebox support 46 is positioned far enough above floor 24 so as to provide ample space for positioning burner grate 52 and ash pan 54 between the underside of firebox support 56 and floor 24.

Seated on the upper surface of firebox support 46 is firebox 56, thermal shell 70 and firebox casing 80.

In the illustrated embodiment, firebox 56 is cube shaped having four vertical sidewalls 62, a floor 64 and a top 66. The walls, floor and top of firebox 56 are manufactured from a refractory material capable of withstanding temperatures on the order of at least 2000° F. and chemical attack by fly ash, possibly in molten form. A suitable refractory material includes a ceramic material having silicon carbide as a majority component. Other refractory materials providing the same desirable properties as a ceramic material are suitable. The sidewalls 62 and floor 64 are connected by conventional means to provide an integral box open at the top. Firebox 56 includes a vertical baffle 68 that extends horizontally between the right and left sidewalls of firebox 56 and extends upward from floor 64 of the firebox to a point below the underside of top 66 when it is secured to the top of vertical sidewalls 62. Baffle 68 is preferably manufactured from the same materials as the sidewalls, floor and top of the firebox. The thicknesses of the walls, floor and top of the firebox are selected so that the temperature gradient in the firebox walls, floor and top is low, so as to avoid degradation due to thermal shock resulting from rapid changes in the temperature of the combustion gases in the firebox. In the preferred embodiment described herein, the thickness of the walls, floor and top of the firebox is on the order of about one inch; however, it should be understood that the ultimate thickness of the firebox walls will depend upon a number of factors, including the size of the firebox and the thermal output of the firebox.

In a preferred embodiment, the volume defined by the internal chamber of the firebox should be large enough that the residence time of the gases resulting from the combustion of the pelletized fuel is long enough to permit complete combustion and minimize the carbon monoxide and unhealthy hydrocarbon gases exhausted from the firebox, yet small enough that the heat loss from the firebox is low, such that the temperature of the gases within the firebox can be maintained at levels necessary to promote complete combustion. In the preferred embodiment illustrated in this application, the internal chamber of the firebox has a specific volume on the order of 0.1 to 0.3 ft$^3$. It should be understood that the present invention is not limited to these specific volumes, and the volume thereof may be larger or smaller than that described above.

Baffle 68 helps to create turbulence in the gases produced by the combustion of the pelletized fuel. The turbulence serves to enhance the mixing of the combustion air and hydrocarbon gases, thus promoting further combustion. The distance between the top of baffle 68 and the underside of top 66 is selected so that the passage of the combustion gases is not impeded. While the firebox has been illustrated in the context of a specific shape, it should be understood that other shapes that provide the desirable characteristics of the firebox as described herein would be suitable.

Firebox 56 is encased by a thermal insulating shell 70 which is congruent in its peripheral configuration to firebox 56 and is sized to snugly receive and surround firebox 56. Thermal insulating shell 70 does not include an internal baffle. Vertical sidewalls 72, floor 74 and top 76 of thermal shell 70 serve to assist in the retention of heat within firebox 56 and therefore are manufactured from a thermally insulating material having high thermal insulating properties and capable of withstanding temperatures associated with the exterior surface of the firebox. An example of suitable thermally insulating materials includes ceramic fiberboard. The thickness of the walls, floor and top of the thermal insulating shell are selected so the desired thermal insulation is provided to maintain the desired temperature within the firebox.

Surrounding the vertical sidewalls 72 of thermal insulating shell 70 is steel firebox frame 80. Firebox frame 80 includes vertical sidewalls 78 that serve to define a substantially square casing into which thermal shell 70 is snugly received. In its assembled form, firebox 56 is positioned within thermal insulating shell 70 which is positioned within firebox frame 80. The external dimensions of the bottom of firebox frame 80 are such that it fits snugly within upstanding sidewalls 48 of firebox support 46.

In order to ensure that top 76 of thermal shell 70 is maintained snugly in place, two S-shaped retaining clips 82 are provided on the inner surface of top 44 of burner casing 34. The ends of flanges 82 that are not attached to the underside of top 44 bear down upon the upper surface of top 76 and serve to hold the top securely in place.

Referring to FIGS. 2, 4 and 5, floor 45 of firebox support 46, floor 74 of thermal insulating shell 70 and floor 64 of firebox 56 include a rectangular aperture rearward of baffle 68 that defines an inlet to firebox 56. Attached to the underside of firebox support 46 adjacent this inlet is burn grate 52. Burn grate 52 is a rectangular element having left sidewall 84, an opposing right sidewall 86 that are connected by a front sidewall 88 and an opposing rear sidewall 90. The combination of these sidewalls define a rectangular chamber open at the top and open at the bottom. Extending between front sidewall 88 and rear sidewall 90 are a plurality of rods 92 whose terminal ends are supported in holes provided in the front sidewall 88 and rear sidewall 90. Rods 92 are spaced apart a distance that permits the combination of the rods to support pelletized fuel for combustion. The rod spacing is selected so that unburned pelletized fuel will not fall between the rods while ash, which is formed by the combustion, can fall between the rods. In addition, the rod spacing is selected so that there is sufficient open space to permit combustion air to pass between the rods to support combustion of the pellet fuel above the grate. In the illustrated embodiment, left sidewall 84 includes an orifice for receiving an igniter 94 for fuel residing on rods 92. One example of a suitable igniter is a hot gas generator. Other types of igniters such as resistive heaters and other articles capable of providing high temperatures to ignite the pellets may be used.

Extending down from left sidewall 84 and right sidewall 86 are opposing horizontal tracks 96. Tracks 96 include a horizontal groove that extends forward and rearward. The horizontal groove is sized to receive guides on the left and right sides of a reciprocating rake 98 positioned below rods 92. Reciprocating rake 98 comprises a plurality of upstanding fingers that extend through the spaces between rods 92. The upward extending fingers are in the shape of inverted T's. In the illustrated embodiment, the reciprocating rake comprises nine upward extending fingers. The leftmost and rightmost fingers carry horizontal outward extending guides that are received by tracks 96 to support the reciprocating rake beneath grate 52. In order to minimize buildup of ash in the corners of the grate 52, the second upward extending fingers from the left edge and the right edge are longer and extend upward further than the balance of the fingers. Reciprocating rake 98 is attached by horizontal rod 100 to a motor driven cam assembly 102 that reciprocates the rake forward to rearward at selected intervals.

Left sidewall 84, right sidewall 86, front sidewall 88 and opposing rear sidewall 90 of the burn grate may optionally include additional openings for permitting secondary combustion air to mix with the fuel. This secondary combustion air is provided via combustion air manifold 142 described below in more detail.

The burner of the present invention has been described above with reference to a particular burn grate. It should be understood that other configurations of a burn grate may be used in the context of the present invention. For example, other burn grate designs are described in U.S. Pat. Nos. 5,488,943, 5,383,446, and 5,295,474.

Pellet fuel is provided to the upper surface of burn grate 52 through openings 104 in firebox 56, 106 in thermal insulating shell 70, 108 in firebox frame 80 and opening 110 in burner casing 34. The positioning of the respective openings is such that a downward sloping pathway is provided moving from rear to front. Openings 106, 108 and 110 receive one end of a fuel feed conduit 112 which has its opposite end connected to a fuel feed system 113 described below in more detail.

The front walls of firebox 56, thermal shell 70, firebox frame 80, burner casing 34 and housing 12 each include a respective opening 114, 116, 118, 120 and 122 that allows exhaust conduit 28 to pass therethrough. These openings are positioned so that exhaust conduit 28 is located at the end of the combustion gas pathway through the firebox. In the illustrated embodiment, the bottom of the openings are positioned at a level aligned with the bottom of the front wall of the firebox 56. Positioning the openings at the bottom of the front wall of the firebox 56 provides for the longest possible pathway for the gases produced by the combustion of the pelletized fuel. By maximizing the length of the pathway, the overall volume of the firebox can be optimized.

Figure 3:
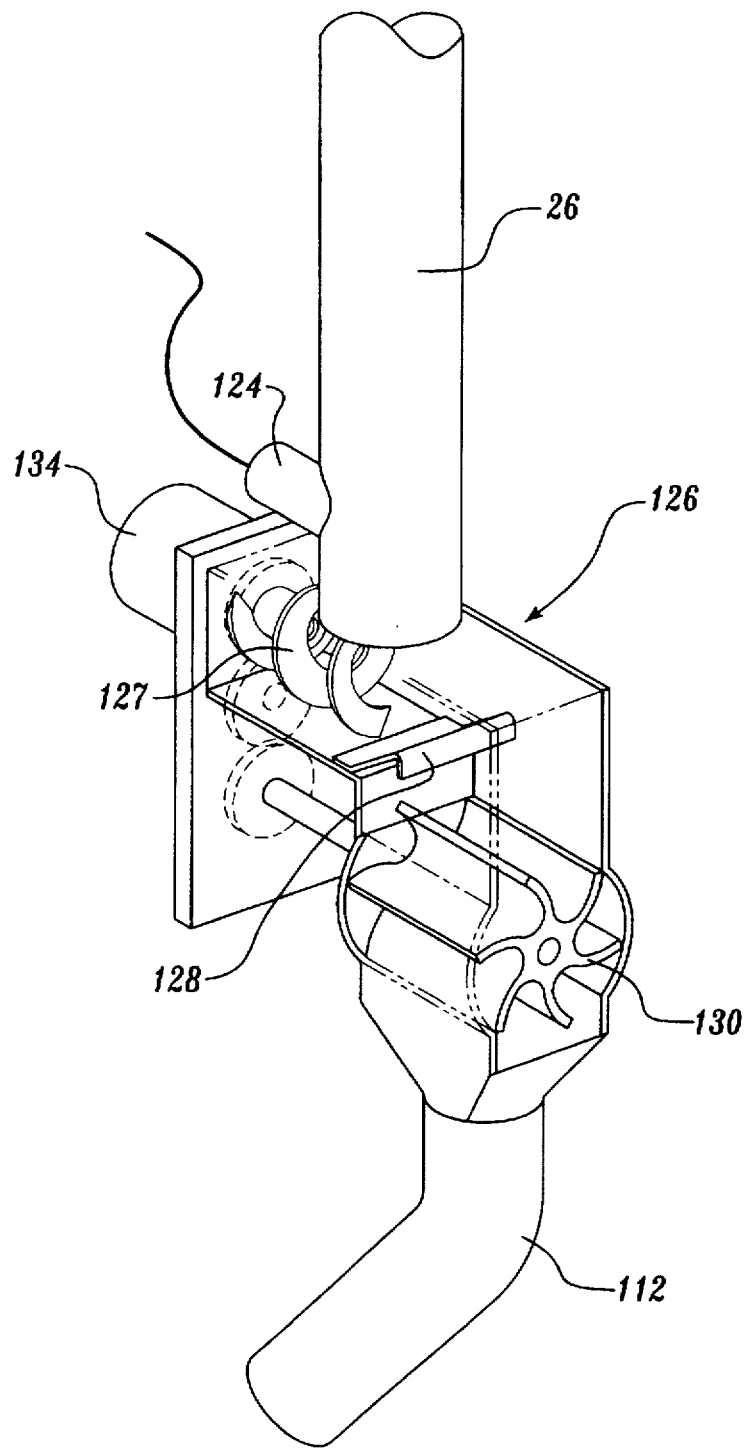
FIG. 3 is a perspective view of the pellet fuel feed system of the present invention.

The end of feed conduit 112 opposite firebox 56 is connected to a fuel feed system 113. Fuel feed system 113 includes fuel conduit 26 having one end connected to a source of pellet fuel. Though not illustrated, a suitable source includes a hopper that includes a motor driven system for periodically delivering pellet fuel through conduit 26 into housing 22. Pellet fuel exits conduit 26 inside of housing 22 and is delivered into one end of a covered trough 126 that is rectangular in cross section. Referring to FIGS. 3 and 5, a conventional helical auger 127 is provided in the forward end of trough 126 for moving the deposited fuel towards the rear of the trough. The rearward end of trough 126 includes an upward and rearward extending ramp 128 over which the fuel is driven before it drops down through the open bottom of the trough into a rotary vane 130 that serves as an airlock between the fuel source and firebox 56. Ramp 128 is provided to even out the flow rate of pellets exiting auger 127. Auger 127 and rotary vane 130 are driven by a single gearing mechanism 132 and a motor 134. The capacity of the rotary vane is greater than the capacity of the auger and therefore build-up of fuel within the rotary vane is avoided. An electrical or mechanical sensor 124 is provided to detect the presence of pellet fuel in supply tube 26 adjacent auger 127. When the fuel level falls below a threshold setting, the sensor signals the fuel source to deliver additional fuel. Beneath rotary vane 130, is located the inlet of fuel feed conduit 112 which delivers the fuel to grate 52.

Fuel feed conduit 112 includes an opening 136 between the point where it passes through burner casing 34 and passes through firebox frame 80. Opening 136 permits combustion air within manifold 142 (established between firebox frame 80 and burner casing 34) to pass into the fuel feed conduit and be delivered into the firebox as tertiary combustion air at a point above the burner grate.

Housing 34 includes an opening for receiving combustion air from the outlet of blower 140. Blower 140 provides combustion air into a combustion air manifold 142 defined between burner casing 34 and firebox frame 80, thermal insulating shell top 76 and firebox support 46. Air from blower 140 passes through this manifold, down around the sides of the firebox frame 80 and below firebox support 46. A portion of this combustion air enters the burn grate from below and provides primary combustion air. A portion of this air also enters the fuel feed conduit 112 through opening 136 and provides tertiary combustion air above burn grate 52. Since firebox 56, thermal insulating shell 70 and firebox frame 80 do not provide 100% thermal insulation, thermal energy that passes through these thermal barriers preferably serves to preheat the combustion air in manifold 142. By preheating the combustion air, the efficiency by which the wood pellet fuel is combusted is increased.

Located directly below firebox support 46 is ash pan 144. Ash pan 144 is supported above the floor of housing 12 by triangular runners 146. Triangular runners 146 allow the ash pan to be slid through an opening provided in burner casing 34 and out of housing 12 through door 30 for emptying.

In operation, the feeding of pellet fuel through conduit 26 is controlled by the feedback from sensor 124 as described above. Auger 127 is activated in response to a control system, such as a thermostat. When it is desired to increase the temperature of the exhaust gases, the gearing mechanism is activated so that auger 127 and rotary vane 130 cooperate to deliver additional fuel to the combustion grate. Conversely, if a lower temperature for the exhaust gases is desired, the control system delays activation of the auger and the rotary vane to reduce the feed rate of fuel to the combustion grate. In addition to adjusting the feed rate of fuel, the control system also controls blower 140 so that adjustments in the combustion air feed rate can be made.

The rotary vane 130 provides an airlock between the source of fuel and combustion chamber, thus obviating the need to maintain a positive pressure in the fuel vessel, and allowing blower 140 to provide a positive pressure in the combustion chamber. Fuel that exits rotary vane 130 falls through fuel feed conduit 112 and onto burn grate 52, where it is combusted or can be ignited by igniter 94. Reciprocating arm 100 is activated periodically to break up clinkers and remove ash from the rods. The removed ash falls into ash pan 144 where it can be easily collected and removed. Gases resulting from the combustion of the fuel move upward through the serpentine path defined within the firebox 56 by baffle 68. The thermal insulation provided to the combustion chamber of the present invention allows for more complete combustion of the fuel compared to pellet fuel burners which do not include a combustion chamber that is substantially fully insulated. The more complete combustion results because the temperature of the combustion chamber is higher which encourages the more complete conversion of the carbon monoxide and hydrocarbons to carbon dioxide and water vapor as well as the burning of small particulate materials. Exhaust carbon monoxide levels less than 200 parts per million, but preferably less than 50 parts per million have been achieved by burners formed in accordance with the present invention using wood pellet fuel as the fuel source.

The thoroughness of the combustion achieved by the burner of the present invention also allows for the design of a burner that is compact and suitable for use in residential heating applications, where space is often limited. As an example, burners formed in accordance with the present invention having combustion chamber volumes on the order of about 0.2 ft$^3$ are able to output at least 80K BTU/hr of thermal energy resulting in specific thermal energy outputs of at least 400K BTU/hr/ft$^3$, and preferably at least 500K BTU/hr/ft$^3$.

Another advantage of the compact nature of the present invention relates to the relative response times that can be achieved by the burner of the present invention. In space heating applications, particularly precise control of the temperature of the exhaust gases is imperative in order to provide the control necessary to maintain the heated environment at the appropriate temperature. Unlike larger incinerators or dryers, the relatively small volume of the firebox in a burner of the present invention translates into a relatively small thermal mass. With small thermal masses, relatively quick changes in the temperature of the exhaust gases can be achieved. For example, in a burner having combustion chamber volumes on the order of 0.2 ft$^3$, the temperature of the exhaust gases can be varied at a rate of at least about 75° F. per minute, preferably 100° F. per minute and most preferably at least 125° F. per minute.

As discussed above, the ability to maintain the gases produced by the combustion of the pelletized fuel at a relatively high temperature helps to incinerate particles that result from the initial combustion of the pelletized fuel and therefore only small amounts of solid particulate exit the firebox of the present invention.

In order to avoid the build up of ash in the boiler, it is preferred that as little ash exit the firebox as possible. Spaced apart rods 92 and reciprocating rake 98 cooperate to minimize the amount of ash exiting the firebox by processing the ash through grate 52 and collecting it below grate 52.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An apparatus fueled by pelletized fuel for producing thermal energy in the form of hot gas comprising:

a firebox comprising a shell of refractory material having an inlet, an outlet, a baffle between the inlet and the outlet, an exterior surface and an interior surface, the shell and the baffle cooperating to define an internal gas pathway;

a thermal shell comprising a thermal insulating material contacting the exterior surface and substantially surrounding the firebox;

a grate located adjacent the inlet where pelletized fuel is combusted;

a fuel feed conduit for delivering the pelletized fuel to the inlet; and a combustion air manifold surrounding the thermal shell for delivering combustion air from a combustion air source around the thermal shell to the grate, the combustion air being heated as it passes from the combustion air source to the grate.

2. The apparatus of claim 1, further comprising a source of pelletized wood fuel and an airlock between the source of the pelletized wood fuel and the firebox.

3. The apparatus of claim 1, wherein the internal gas pathway is serpentine in shape.

4. The apparatus of claim 1, wherein the hot gas exits the outlet of the firebox at a temperature of at least 1000° F.

5. The apparatus of claim 4, wherein the hot gas exits the outlet of the firebox at a temperature of at least 2000° F.

6. The apparatus of claim 1, wherein the combustion air source is a blower.

7. The apparatus of claim 1, wherein the grate comprises a plurality of spaced apart rods.

8. The apparatus of claim 7, wherein the grate further comprises a plurality of reciprocating elements extending between the rods for removing clinkers and ash from the grate.

9. The apparatus of claim 1, wherein the refractory material is different from the thermal insulating material.

10. The apparatus of claim 1, wherein the refractory material comprises a ceramic and the thermal insulating material comprises a ceramic fiber board.

11. The apparatus of claim 1, wherein the specific thermal energy output of the apparatus is at least 400K BTU/hr/ft$^3$.

12. The apparatus of claim 1, wherein the specific thermal energy output of the apparatus is at least 550K BTU/hr/ft$^3$.

\* \* \* \* \*